United States Patent
Markus et al.

(10) Patent No.: US 8,174,443 B2
(45) Date of Patent: May 8, 2012

(54) TRUE TIME DELAY SYSTEMS WITH ARRAY ANTENNA FOR THE SPATIALLY CHANGEABLE RADIATION PATTERN FOR MAXIMUM POWER ULTRA-WIDEBAND PULSES

(75) Inventors: Jung Markus, Eicklingen (DE); Jürgen Schmitz, Gifhorn (DE); Bernd Schünemann, Bergen (DE); Gerd-Walter Wollmann, Celle (DE)

(73) Assignee: Rheinmetal Waffe Munition GmbH, Unterluss (DE)

( * ) Notice: Subject to any disclaimer, the term of this patent is extended or adjusted under 35 U.S.C. 154(b) by 204 days.

(21) Appl. No.: 12/677,084

(22) PCT Filed: Aug. 12, 2008

(86) PCT No.: PCT/EP2008/006639
§ 371 (c)(1),
(2), (4) Date: May 14, 2010

(87) PCT Pub. No.: WO2009/033541
PCT Pub. Date: Mar. 19, 2009

(65) Prior Publication Data
US 2010/0277371 A1  Nov. 4, 2010

(30) Foreign Application Priority Data
Sep. 7, 2007 (DE) .......................... 10 2007 042 614

(51) Int. Cl.
*H01Q 3/22* (2006.01)
(52) U.S. Cl. ......................................... 342/375
(58) Field of Classification Search ............... 342/375
See application file for complete search history.

(56) References Cited

U.S. PATENT DOCUMENTS

| 5,109,203 | A | | 4/1992 | Zucker et al. |
|---|---|---|---|---|
| 5,313,056 | A | | 5/1994 | Kim et al. |
| 6,067,673 | A | * | 5/2000 | Paese et al. ................. 4/623 |
| 6,515,622 | B1 | * | 2/2003 | Izadpanah et al. ........ 342/368 |
| 7,051,636 | B1 | | 5/2006 | Snow et al. |

(Continued)

FOREIGN PATENT DOCUMENTS

DE   19638 149 A1   3/1997

(Continued)

OTHER PUBLICATIONS scholar.lib.vt.edu.online text, "Chapter 3, Antenna Arrays and Beamforming," pp. 29-52.

(Continued)

*Primary Examiner* — Harry Liu
(74) *Attorney, Agent, or Firm* — Griffin & Szipl, P.C.

(57) ABSTRACT

An HPEM module (1,10) is provided, wherein the output pulse or the trigger pulse is transmitted on a single input trigger pulse (Trigger 2, 11) with an intermediate TTD network (5, 14) in a phase-defined and time-defined manner independent of frequency depending on the selected input of the electromagnetic lens via the geometric form of the lens. The trigger signal defines the time point for the generation of an UWB pulse in the pulse generator (3, 16). The main lobe of an antenna array (1*n) of several antennae (7, 15) is thus altered in the same number of positions in a plane accordingly as the number of adjustable phase differences or time differences. For an m*n array the alignment of the antenna lobe is no longer restricted to the plane.

16 Claims, 1 Drawing Sheet

U.S. PATENT DOCUMENTS

2006/0060074 A1 3/2006 Ham et al.
2006/0164282 A1 7/2006 Duff et al.

FOREIGN PATENT DOCUMENTS

EP 1 431 773 A 6/2004
WO 02/054204 A 7/2002

OTHER PUBLICATIONS

International Search Report issued in corresponding No. PCT/EP2008/006639, completed Nov. 14, 2008, mailed Nov. 20, 2008.
Relevant pages of http://elib.dir.de/22932.
W. Sörgel et al., UWB Antenna Arrays. In Benedetto, M.G. di; Hirt, W. Kaiser, T.; Molisch, A. Oppermann, I.; Porcino, D. (ed).: UWB Communication Systems—A Comprehensive Overview EURASIP Book Series, Hindawi Publisher, Apr. 2005, ISBN 977-5945-10-0.
R. Rotmann et al., "Wideband RF Beamforming: The Rotmann Lens vs. Photonic Beamforming," Antennas and Propagation Society Symposium, Jul. 3-8, 2005.
Buck et al., "Design Considerations and Technology Assessment of Phased-Array Antenna Systems With RF MEMS for Automotive Radar Applications," IEEE Transactions on Microwave Theory and Techniques, vol. 53, No. 6, Jun. 2005, pp. 1968-1975.
A.N. Bratchikov, "Photonic Beamforming In Ultra-Wideband Phased Antenna Arrays: Present State and Perspectives," Ultrawideband and Ultrashort Impulse Signals, Sep. 18-22, 2006. Sevastopol, Ukraine, pp. 159-164.
"Terror-Abwehr mit High-Tech: HPEM von Rheinmetall gegen Sprengfallen," Internet Citation, [Online] XP002455792.

* cited by examiner

TRUE TIME DELAY SYSTEMS WITH ARRAY ANTENNA FOR THE SPATIALLY CHANGEABLE RADIATION PATTERN FOR MAXIMUM POWER ULTRA-WIDEBAND PULSES

This is a National Phase Application in the United States of International Patent Application No. PCT/EP2008/006639 filed Aug. 12, 2008, which claims priority on German Patent Application No. DE 10 2007 042 614.5, filed Sep. 7, 2007. The entire disclosures of the above patent applications are hereby incorporated by reference.

FIELD OF THE INVENTION

The invention relates to electronic directing of antenna beams or pulses by means of true time delay (TTD) networks working with ultra-wideband (UWB) pulses, i.e., an electronic deflection of antennas by means of a TTD network.

BACKGROUND OF THE INVENTION

Certain areas, e.g., on a road in front of a vehicle, are frequently scanned for various situations by means of radar in order to collect information and to make it available for further processing. In EP 1 431 773 A2 an angle-scanning radar system is described in which an array antenna is provided that is controlled via a beam-forming network. A coupling unit enables the operation of the array antenna for the transmitting and receiving device. Separate sensitivities are set for various angle sections in order to detect objects with angular resolution. The radar system serves, thereby, as vehicle assistance.

Active antennas are able to change their radiation pattern electronically in order to be able to track objects from moveable platforms, such as from vehicles. For antennas with digital beam-forming, the radiation pattern can, in addition, be adapted to the surroundings, and several radiation lobes are produced in order to establish the connection to several remote stations simultaneously, as well as to suppress jamming transmitters by zero adjusting in the directional diagram (see http://elib.dir.de/22932/). An antenna with electronic deflection is known from DE 196 38 149 A1. The deflection is achieved through controlled phase shifters. Establishing the phase shifting enables the directional diagram to turn in each desired direction within a two-dimensional angular range.

The Rotman lens, or the Butler matrices, are known as so-called beam-forming networks (http://scholar.lib.vt.edu/theses/available/etd-04262000-15330030/unrestricted/ch3.pdf). DE 196 38 149 A1 enumerates other electromagnetic lenses. The Rotman lens, or Butler matrices, have been used up to now for continuously sinusoidal or pulsed sinusoidal high-frequency signals (pulse radar, CW radar), whose frequency bandwidth comprises max. one octave (e.g., 1-2 GHz).

The article on the Internet at the Internet site http://copernicus.org/URSI/kh tagung/2000/abstracts/ccc0049.pdf deals with the development of a Rotman lens at 94 GHz for controlling an antenna row. The lens designed in the W band at 94 GHz includes 13 input ports for an angle range of ±30° in steps of 4.8°, as well as 20 output ports for controlling the 20 antenna elements.

In particular, with very short-duration rapidly rising pulses, for example, in the range of some 10 to 100 picoseconds, a time variation at triggering is necessary and, if possible, below ¼ of the rise time. This is only possible with absolutely stable runtimes of the system with high thermal stability, or the like effort. Furthermore, at a pulse repeat rate of, for example, 100 kHz, control of the beam from pulse to pulse is difficult to implement with this high resolution in terms of time. If the entire system, or the individual modules, is/are rotated mechanically, then a very high mechanical angular velocity is necessary.

The object of the invention is to disclose a control of a radiation main lobe with very precise spatial resolution in row and/or slot.

SUMMARY OF THE INVENTION

The object of the invention is achieved by the features of a first embodiment of the invention, which pertains to a high power electromagnetics (HPEM) module (1) provided with at least one trigger (2), a pulse generator (3) following the trigger (2), a TTD network (5) with several inputs (4) as well as a number of outputs, on which a number (m) of antennas (7) are conducted, wherein the trigger signal of the trigger (2) prescribes the point in time of the generation of a UWB pulse in the pulse generator (3), and the pulse generator switches the UWB pulse to one of the inputs (4) of the TTD network (5) and a time delay is set with the TTD network (5), after which the pulses are delivered via the antennas (7) as the main lobe. Advantageous additional embodiments of the present invention are listed below as follows.

In accordance with a second embodiment of the present invention, a HPEM module (10) is provided with at least one trigger (11), a TTD network (14) following the trigger (11) with several inputs (13) as well as a number of outputs, on which a number (m) of antennas (15) are conducted, each with a pulse generator (16) incorporated between the TTD network (14) and the respective antenna (15), wherein the trigger signal of the trigger (2) is switched on one of the inputs (13), a time delay is set with the TTD network (5), and then a UWB pulse is generated in the respective pulse generator (16) and is delivered via the antennas (15). In accordance with a third embodiment of the invention, the first embodiment and the second embodiment are modified so that the TTD network (5, 14) is an electromagnetic lens, a detour phase shifter provided with line structures, optical line structures, or optical free-radiation structures. In accordance with a fourth embodiment of the present invention, the second embodiment is modified so that the TTD network (14) is used in the low-power range. In accordance with a fifth embodiment of the present invention, the second embodiment, or the fourth embodiment, are further modified so that the TTD network (5, 14) is a scalable high-power system.

In accordance with a sixth embodiment of the present invention, the first embodiment, the second embodiment, the third embodiment, the fourth embodiment, and the fifth embodiment, are further modified so that the main lobe can also be swiveled in the case of a narrow band, wherein the pulse generator(s) (3, 16) is/are replaced by amplifiers and the trigger is replaced by a narrow-band signal generator. In accordance with a seventh embodiment of the invention, the third embodiment is further modified so that, depending on the selected input (4, 13) of the electromagnetic lens, the output pulse or the trigger pulse is transmitted in a phase-defined or time-defined and frequency-independent manner via the geometric shape of the lens.

In order to increase the range of superimposed transient pulses locally, it is necessary for the entire system or the transmitted electromagnetic field to swivel. Thus, it is theoretically possible to obtain the n-fold field strength with n-elements in an ideal manner. If the beam is neither swiveled electronically nor the total system mechanically, it is necessary to provide an $n^2$-fold transmission power for the n-fold transmission field strength. With a modular structure of systems, it is possible to carry out a so-called "beam steering" via various pulse time sequences.

With a modular structure of HPEM (high power electromagnetics) modules that are based on UWB pulses (i.e. on transient pulses in the range of a few picoseconds up to a few 100 nanoseconds pulse duration) and an antenna array, it is possible to carry out the so-called beam steering via various pulse time sequences. The superimposition of the pulses, which are triggered at different times or are transmitted at different times in another manner, results in local excesses, or extinguishings, so that a certain area, in particular in front of the vehicle that is equipped with such modules, can be irradiated with a stronger (composite) pulse. A scanning from top to bottom, from right to left and vice versa is therefore made possible only through time delay of the UWB pulses without further directing of the antennas.

Taking these considerations as a starting point, the invention is based on the concept of transmitting the output pulse or the trigger pulse in a phase-defined or time-defined and frequency-independent manner, with a single input trigger pulse and an interposed TTD network, depending on the selected input of the electromagnetic lens via the geometric shape of the lens. For power maximization, the latter variant is wiser in practice, because the power is unlimited through multiplication of the pulse generators/amplifiers. For an antenna row 1*n, the main lobe can then be influenced depending on the number of phase differences or time differences that can be established, into the same number of positions in a plane. With most TTD networks, the number of positions corresponds to the number of input ports of a TTD network. For an m*n array, the orientation of the antenna lobe is no longer restricted to the plane.

The advantage, i.a., is that now the TTD networks are operated with UWB signals, i.e., by means of pulsed transient signals and not only with sinusoidal or pulsed sinusoidal signals. For high power systems, virtually unlimited scalings are possible, for example, with respectively >10 kV amplitudes. The TTD network is used thereby in the low-power range; thus, electrical breakdowns can also be avoided in the case of high power.

Using the UWB system, bandwidths of one to several decades (e.g. 100 MHz-10 GHz) are possible with Gaussian signals. The use of these UWB systems is intended for the convoy protection of vehicles, but is not to be restricted thereto. In addition to the jamming operation, the system can also be used for communication.

BRIEF DESCRIPTION OF THE DRAWINGS

The invention is to be explained in more detail based on an exemplary embodiment with the drawings. They show.

DETAILED DESCRIPTION OF EXEMPLARY EMBODIMENT OF THE INVENTION

Figure 1:
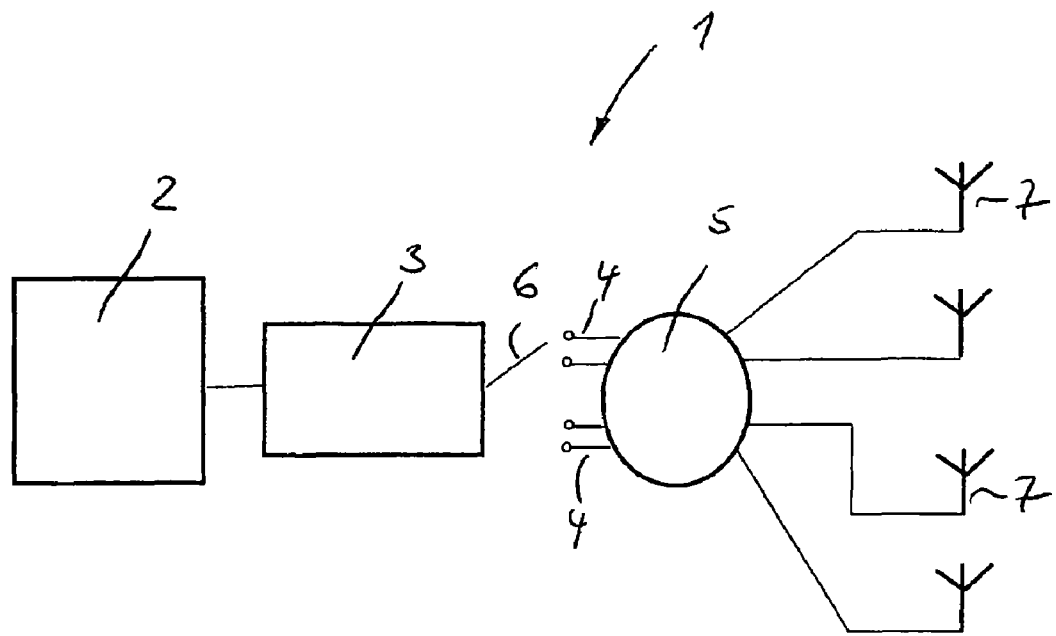
FIG. 1, which illustrates a first variant of a phase-defined UWB system of the present invention.

FIG. 1 shows a first variant for a UWB system 1 (HPEM module), in accordance with the present invention, which is provided with at least one trigger 2, preferably followed by a pulse generator 3. The pulse generator can be switched to inputs 4 of a TTD network 5 via a switch 6. At the output side, the network 5 has several antennas 7. The number m of the antennas 7 is not limited to the four shown. The antennas 7 can be assembled to form a row of antennas and these can be assembled to form an antenna array.

Figure 2:
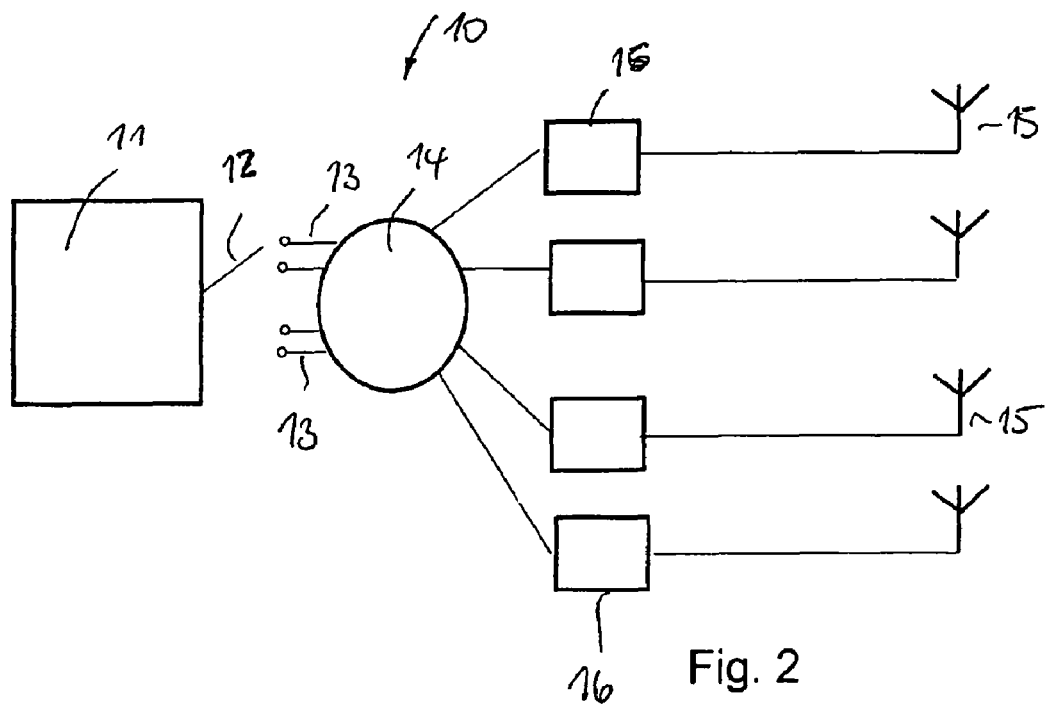
FIG. 2, which illustrates a further variant of a phase-defined UWB system in accordance with the present invention.

FIG. 2 shows a further variant for a UWB system 10 (HPEM module), in accordance with the present invention, which likewise has at least one trigger 11. In this variant, the trigger 11 can be switched to the inputs 13 of a TTD network 14 via a switch 12. At the output side of the TTD network 14, pulse generators 16 lie in each branch between the network 14 and antennas 15. Here, too, the number m of the antennas 15 is not limited to the four shown. The antennas 15 can be assembled to form a row of antennas and these can be assembled to form an antenna array.

In contrast to the known limited sinusoidal or pulsed sinusoidal signals, a UWB pulse is provided for the UWB system 1, 10. This pulse can be described by $$s(t) = S \cdot \exp(-kt^2)$$

where
S is the pulse amplitude, and
k is the rise time.

The spectrum of such a pulse can be ascertained through the continuous Fourier transform to produce $$S(f) = S\sqrt{\frac{\pi}{k}} \exp\left(-\frac{\pi^2}{k}f^2\right).$$

S can thereby be a voltage amplitude or field amplitude in V or V/m.

UWB pulse generators (3, 16) currently reach amplitudes of up to several 10 kV with rise times of less than 300 ps, which according to the model can be calculated to give $$\tau = t_{90\%} - t_{10\%} = \left| \mp\sqrt{\frac{\ln 0.9}{-k}} \pm \sqrt{\frac{\ln 0.1}{-k}} \right|.$$

The electrical field strength $\vec{e}_{individual}$ (t, r) and, thus, the function of an individual antenna 7, 15 can be described in the time range according to Sörgel et al. (Sörgel, W; Waldschmidt, C; Wiesbeck, W.: UWB Antenna Arrays. In: Benedetto, M. G. di; Hirt, W.; Kaiser, T.; Molisch, A.; Oppermann, I.; Porcino, D. (ed.): UWB Communication Systems—A Comprehensive Overview. EURASIP Book Series, Hindawi Publisher, April 2005, ISBN 977-5945-10-0.) through the convolution relation $$\frac{\vec{e}_{einzel}(t,\vec{r})}{\sqrt{Z_0}} = \frac{1}{2\pi c_0 r}\delta\left(t - \frac{r}{c_0}\right) * \vec{h}_{einzel}(t,\theta,\psi) * \frac{\partial}{\partial t}\frac{u(t)}{\sqrt{Z_C}}.$$

In the above relationship, $\vec{e}_{einzel}(t, \vec{r})$ is $\vec{e}_{individual}(t, \vec{r})$, $Z_0 = 120\pi\Omega$ is the characteristic impedance of the free space, $Z_C$ is the port impedance of the antenna, u(t) is the time-dependent antenna input voltage, and $\vec{h}_{einzel}(t, \theta, \phi)$ is $\vec{h}_{individual}(t, \theta, \phi)$, which is the pulse response. The distribution $\delta(t-r/c_0)$ characterizes the time delay between excitation and ascertained field strength at a site that essentially depends on the distance r and the light velocity $c_0$.

The pulse response of a uniform linear array with n antenna elements, which is arranged along the y axis, can be determined with the aid of the convolution $$\vec{h}_{gesamt}(t,\theta,\psi) = f_{Ar}(t,\vec{r}) * \vec{h}_{einzel}(t,\theta,\psi)$$

In the above relationship, $\vec{h}_{gesamt}(t, \theta, \psi)$ is $\vec{h}_{total}(t, \theta, \psi)$, and $\vec{h}_{einzel}(t, \theta, \psi)$ is $\vec{h}_{individual}(t, \theta, \psi)$.

For a swivel direction $\psi$ in the x-y plane from the main beam axis, the array factor is given in the time range thereby by $$f_{Ar}(t, \psi) = \sum_{i=1}^{n} W_i(t) * \delta(t - \tau_i(\psi)).$$

In the above relationship, $W_i(t)$ is the transfer function of the i-th feed network of the individual antennas, which as a rule are identical. $T_i(\psi)$ corresponds to the time delay that the signal needs from the antenna to the base in the far-field region.

Thus, a swiveling of the radiated main lobe is achieved by implementing a fixed time delay $\Delta\tau$ between the adjacent elements. Meanwhile, the point of maximum field strength when using an isotropic individual antenna can be derived with the relationship $$\psi_{max} = \arcsin\left(\frac{\Delta\tau c_0}{d}\right).$$

The time delay between two adjacent elements is calculated geometrically thereby. From this, the sensitivity of the swivel angle can likewise be calculated as a function of the time difference. Where, e.g., d=0.3 m and $\Delta\tau$=1 ps, a relative angle change of 0.06 degree/ps is found. At a time measuring precision of 50 ps, an angle error of approx. 3 degrees is found for this configuration.

A frequency-independent TTD network on a line basis (microstrips, strip line, etc.), such as a Rotman lens, detour phase shifter, etc., thereby guarantees the correct position of the main lobe depending on the switch position at the input. This means that this TTD network for N positions of the main lobes selected, as desired, generates the correct delay times of the individual antennas 7, 15 among themselves.

A trigger signal predetermines the point in time of the generation of a UWB pulse in the pulse generator 3, 16. Depending on the system variants, the time delays after or before the pulse generator 3, 16 are set through the TTD network 5, 14. Both systems 1, 10 enable the main lobe to be swiveled, even in the case of a narrow band, if the pulse generator 3 is replaced by an amplifier and the trigger 2 is replaced by a narrow-band signal generator.

The system 10 enables an increase in the transmitted power by a factor n compared with the system 1. It is required, thereby, that the TTD network 14 is an ideal power divider from 1 to n ports with the specified time delay, wherein all antennas 15 are identical.

When pulse generators 3, 16 with voltage amplitudes of more than 10 kV are used, a design of a breakdown-proof TTD network 5, 14 is required. A trigger- or signal generator at the input of each pulse generator or amplifier, as a rule, delivers voltage amplitudes of less than 100 V, therefore, in the low-volt range. Electrical breakdowns within the TTD network are not to be expected. A breakdown-proof design of the antennas must be ensured.

The invention claimed is:

1. A high power electromagnetics (HPEM) module comprises:
   (a) at least one trigger;
   (b) a pulse generator operably connected to the at least one trigger;
   (c) a true time delay (TTD) network provided with a plurality of inputs as well as a plurality of outputs; and
   (d) a number m of antennas conducted on the plurality of outputs, wherein the trigger generates a trigger signal that prescribes a point in time of generation of an ultra-wideband pulse in the pulse generator, wherein the pulse generator switches the ultra-wideband pulse to one of the inputs of the true time delay (TTD) network, and a time delay is set by operation of the true time delay (TTD) network, after which the ultra-wideband pulses are delivered via the antennas as a main lobe.

2. A high power electromagnetics (HPEM) module according to claim 1, wherein the true time delay (TTD) network is selected from the group consisting of an electromagnetic lens, a detour phase shifter with line structures, optical line structures, and optical free-radiation structures.

3. A high power electromagnetics (HPEM) module according to claim 2, wherein true time delay (TTD) network is the electromagnetic lens, and depending on selected input of the electromagnetic lens, an output pulse, or a trigger pulse, is transmitted by the true time delay (TTD) network in a phase-defined manner, or in a time-defined and frequency-independent manner, via a geometric shape of the electromagnetic lens.

4. A high power electromagnetics (HPEM) module comprises:
   (a) at least one trigger;
   (b) a true time delay (TTD) network operably connected to the at least one trigger, wherein the true time delay (TTD) network is provided with a plurality of inputs as well as a plurality of outputs; and
   (c) a number m of antennas conducted on the plurality of outputs, wherein each output is provided with a pulse generator incorporated between the true time delay (TTD) network and a respective one of the antennas, wherein the trigger generates a trigger signal that is switched on one of the inputs by a switch, and a time delay is set by operation of the true time delay (TTD) network, and then an ultra-wideband pulse is generated in each pulse generator and the ultra-wideband pulse generated by each pulse generator is delivered via the respective antenna.

5. A high power electromagnetics (HPEM) module according to claim 4, wherein the true time delay (TTD) network operates in a low-power range.

6. A high power electromagnetics (HPEM) module according to claim 4, wherein in that the true time delay (TTD) network is a scalable high-power system.

7. A high power electromagnetics (HPEM) module according to claim 4, wherein the true time delay (TTD) network is selected from the group consisting of an electromagnetic lens, a detour phase shifter with line structures, optical line structures, and optical free-radiation structures.

8. A high power electromagnetics (HPEM) module according to claim 7, wherein the true time delay (TTD) network is the electromagnetic lens, and depending on selected input of the electromagnetic lens, an output pulse, or a trigger pulse, is transmitted by the true time delay (TTD) network in a phase-defined manner, or in a time-defined and frequency-independent manner, via a geometric shape of the electromagnetic lens.

9. A high power electromagnetics (HPEM) module according to claim 5, wherein the true time delay (TTD) network is a scalable high-power system.

10. A high power electromagnetics (HPEM) module comprises:
- (a) at least one narrow-band signal generator;
- (b) an amplifier operably connected to the at least one narrow-band signal generator;
- (c) a true time delay (TTD) network provided with a plurality of inputs as well as a plurality of outputs; and
- (d) a number m of antennas conducted on the plurality of outputs, wherein the narrow-band signal generator generates a trigger signal that prescribes a point in time of generation of an ultra-wideband pulse in the amplifier, wherein the amplifier switches the ultra-wideband pulse to one of the inputs of the true time delay (TTD) network, and a time delay is set by operation of the true time delay (TTD) network, after which the ultra-wideband pulses are delivered via the antennas as a main lobe, wherein the main lobe can be swiveled in the case of a narrow band.

11. A high power electromagnetics (HPEM) module according to claim 10, wherein the true time delay (TTD) network is selected from the group consisting of an electromagnetic lens, a detour phase shifter with line structures, optical line structures, and optical free-radiation structures.

12. A high power electromagnetics (HPEM) module comprises:
- (a) at least one narrow-band signal generator;
- (b) a true time delay (TTD) network operably connected to the at least one narrow-band signal generator, wherein the true time delay (TTD) network is provided with a plurality of inputs as well as a plurality of outputs; and
- (c) a number m of antennas conducted on the plurality of outputs, wherein each output is provided with an amplifier incorporated between the true time delay (TTD) network and a respective one of the antennas, wherein the narrow-band signal generator generates a trigger signal that is switched on one of the inputs by a switch, and a time delay is set by operation of the true time delay (TTD) network, and then an ultra-wideband pulse is generated in each amplifier and the ultra-wideband pulse generated by each amplifier is delivered via the respective antenna.

13. A high power electromagnetics (HPEM) module according to claim 12, wherein the true time delay (TTD) network is selected from the group consisting of an electromagnetic lens, a detour phase shifter with line structures, optical line structures, and optical free-radiation structures.

14. A high power electromagnetics (HPEM) module according to claim 12, wherein the true time delay (TTD) network operates in a low-power range.

15. A high power electromagnetics (HPEM) module according to claim 12, wherein the true time delay (TTD) network is a scalable high-power system.

16. A high power electromagnetics (HPEM) module according to claim 14, wherein the true time delay (TTD) network is a scalable high-power system.

* * * * *